(12) United States Patent
Benhase et al.

(10) Patent No.: US 9,335,930 B2
(45) Date of Patent: *May 10, 2016

(54) PERFORMING ASYNCHRONOUS DISCARD SCANS WITH STAGING AND DESTAGING OPERATIONS

(71) Applicant: International Business Machines Corporation, Armonk, NY (US)

(72) Inventors: Michael T. Benhase, Tucson, AZ (US); Lokesh M. Gupta, Tucson, AZ (US); Matthew J. Kalos, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/955,889

(22) Filed: Dec. 1, 2015

(65) Prior Publication Data

US 2016/0085454 A1    Mar. 24, 2016

Related U.S. Application Data

(63) Continuation of application No. 14/073,551, filed on Nov. 6, 2013, which is a continuation of application No. 13/491,818, filed on Jun. 8, 2012.

(51) Int. Cl.
*G06F 12/08*    (2006.01)
*G06F 3/06*    (2006.01)

(52) U.S. Cl.
CPC ............ *G06F 3/0608* (2013.01); *G06F 3/0619* (2013.01); *G06F 3/0641* (2013.01); *G06F 3/0665* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 4,875,155 A | 10/1989 | Iskiyan et al. | |
| 6,356,980 B1 * | 3/2002 | Arimilli | G06F 12/0897 711/122 |
| 6,606,687 B1 | 8/2003 | Chauvel et al. | |
| 7,191,207 B2 | 3/2007 | Blount | |
| 7,769,802 B2 | 8/2010 | Smith et al. | |
| 8,549,222 B1 | 10/2013 | Kleiman et al. | |
| 8,621,145 B1 | 12/2013 | Kimmel et al. | |
| 9,043,550 B2 | 5/2015 | Benhase et al. | |

(Continued)

FOREIGN PATENT DOCUMENTS

EP    1030243    2/1999

OTHER PUBLICATIONS

Office Action dated Dec. 17, 2015, pp. 33, for U.S. Appl. No. 14/849,415, filed Sep. 9, 2015.

(Continued)

*Primary Examiner* — Brian Peugh
*Assistant Examiner* — Tracy Chan
(74) *Attorney, Agent, or Firm* — Rabindranath Dutta; Konrad Raynes Davda & Victor LLP

(57) ABSTRACT

A controller receives a request to perform staging or destaging operations with respect to an area of a cache. A determination is made as to whether one or more discard scans are being performed or queued for the area of the cache. In response to determining that one or more discard scans are being performed or queued for the area of the cache, the controller avoids satisfying the request to perform the staging or the destaging operations or a read hit with respect to the area of the cache.

12 Claims, 8 Drawing Sheets

(56) References Cited

U.S. PATENT DOCUMENTS

| | | | |
|---|---|---|---|
| 9,176,892 B2 | 11/2015 | Benhase et al. | |
| 9,176,893 B2 | 11/2015 | Benhase et al. | |
| 9,189,401 B2 | 11/2015 | Benhase et al. | |
| 9,195,598 B2 | 11/2015 | Benhase et al. | |
| 2004/0117441 A1* | 6/2004 | Liu | G06F 12/0888 709/203 |
| 2004/0260882 A1 | 12/2004 | Martinez et al. | |
| 2006/0069888 A1 | 3/2006 | Martinez | |
| 2006/0294301 A1* | 12/2006 | Zohar | G06F 3/0611 711/113 |
| 2008/0104329 A1* | 5/2008 | Gaither | G06F 12/0888 711/138 |
| 2009/0222621 A1 | 9/2009 | Ash et al. | |
| 2009/0249015 A1 | 10/2009 | Tzeng | |
| 2010/0037226 A1 | 2/2010 | Benhase et al. | |
| 2010/0257321 A1 | 10/2010 | Gupta | |
| 2012/0198174 A1 | 8/2012 | Nellans et al. | |
| 2012/0239853 A1 | 9/2012 | Moshayedi | |
| 2012/0324173 A1 | 12/2012 | Benhase et al. | |
| 2013/0042156 A1 | 2/2013 | Srinivasan et al. | |
| 2013/0138884 A1 | 5/2013 | Kawamura | |
| 2013/0267246 A1 | 10/2013 | Srinivasan | |
| 2013/0318283 A1 | 11/2013 | Small et al. | |
| 2013/0332646 A1 | 12/2013 | Benhase et al. | |
| 2014/0047187 A1 | 3/2014 | Benhase et al. | |
| 2014/0068163 A1 | 3/2014 | Benhase et al. | |
| 2015/0121007 A1 | 4/2015 | Benhase et al. | |

OTHER PUBLICATIONS

Office Action dated Dec. 24, 2015, pp. 37, for U.S. Appl. No. 14/852,123, filed Sep. 11, 2015.
Final Office Action dated Feb. 12, 2015, pp. 24, for U.S. Appl. No. 141073,612, filed Nov. 6, 2013.
Response filed May 12, 2015, pp. 6, to Final Office Action dated Feb. 12, 2015, pp. 24, for U.S. Appl. No. 14/073,612, filed Nov. 6, 2013.
Notice of Allowance dated May 19, 2015, pp. 18, for U.S. Appl. No. 14/073,612, filed Nov. 6, 2013.
Notice of Allowance dated Jun. 22, 2015, pp. 13, for U.S. Appl. No. 14/073,612, filed Nov. 6, 2013.
U.S. Appl. No. 14/849,415, filed Sep. 9, 2015.
U.S. Appl. No. 14/852,123, filed Sep. 11, 2015.
G. Smith, "The Linux Page Cache and pdflush: Theory of Operation and Tuning for Write-Heavy Loads", 2007, pp. 2 [online] http://www.westnet.com/gsmith/content/linux-pdflush.htm.
C.K. Shene, "Multithreaded Programming and ThreadMentor: A Tutorial", Department of Computer Science, Michigan Technological University, Mar. 2011, pp. 2.
Batsakis et al., "AWOL: An Adaptive Write Optimizations Layer", FAST '08: 6th USENIX Conference on File and Storage Technologies, 2008, pp. 14.
Preliminary Amendment filed Jun. 11, 2012, pp. 3, for U.S. Appl. No. 13/491,795, filed Jun. 8, 2012.
Response dated Aug. 5, 2014, pp. 14, to Office Action dated May 5, 2014, pp. 31, for for U.S. Appl. No. 13/491,795, filed Jun. 8, 2012.
Final Office Action dated Oct. 31, 2014, pp. 19, for U.S. Appl. No. 13/491,795, filed Jun. 8, 2012.
Response dated Feb. 2, 2015, pp. 8, to Final Office Action dated Oct. 31, 2014, pp. 19, for U.S. Appl. No. 13/491,795, filed Jun. 8, 2012.
Notice of Allowance dated May 8, 2015, pp. 36, for U.S. Appl. No. 13/491,795, filed Jun. 8, 2012.
Notice of Allowance dated Jun. 25, 2015, pp. 11, for U.S. Appl. No. 13/491,795, filed Jun. 8, 2012.
Preliminary Remarks dated Nov. 6, 2013, pp. 2, for U.S. Appl. No. 14/073,545, filed Nov. 6, 2013.
Office Action dated May 16, 2014, pp. 21, for U.S. Appl. No. 14/073,545, filed Nov. 6, 2013.
Response dated Aug. 18, 2014, pp. 7, to Office Action dated May 16, 2014, pp. 21, for U.S. Appl. No. 14/073,545, filed Nov. 6, 2013.
Final Office Action Nov. 6, 2014, pp. 17, for U.S. Appl. No. 14/073,545, filed Nov. 6, 2013.
Response dated Feb. 5, 2015, pp. 6, to Final Office Action Nov. 6, 2014, pp. 17, for U.S. Appl. No. 14/073,545, filed Nov. 6, 2013.
Notice of Allowance dated Jun. 18, 2015, pp. 11, for U.S. Appl. No. 14/073,545, filed Nov. 6, 2013.
Office Action dated May 8, 2014, pp. 28, for U.S. Appl. No. 13/491,818, filed Jun. 8, 2012.
Response dated Aug. 8, 2014, pp. 22, to Office Action dated May 8, 2014, pp. 28, for U.S. Appl. No. 13/491,818, filed Jun. 8, 2012.
Final Office Action dated Nov. 6, 2014, pp. 21, for U.S. Appl. No. 13/491,818, filed Jun. 8, 2012.
Response dated Feb. 5, 2015, pp. 13, to Final Office Action dated Nov. 6, 2014, pp. 21, for U.S. Appl. No. 13/491,818, filed Jun. 8, 2012.
Office Action dated May 21, 2015, pp. 29, for U.S. Appl. No. 13/491,818, filed Jun. 8, 2012.
Response dated Aug. 21, 2015, pp. 14, to Office Action dated May 21, 2015, pp. 29, for U.S. Appl. No. 13/491,818, filed Jun. 8, 2012.
Notice of Allowance dated Sep. 17, 2015 for U.S. Appl. No. 13/491,818, filed Jun. 8, 2012.
Preliminary Remarks dated Nov. 6, 2013, pp. 2, for U.S. Appl. No. 14/073,551, filed Nov. 6, 2013.
Office Action dated May 8, 2014, pp. 22, for U.S. Appl. No. 14/073,551, filed Nov. 6, 2013.
Response dated Aug. 8, 2014, pp. 18, to Office Action dated May 8, 2014, pp. 22, for U.S. Appl. No. 14/073,551, filed Nov. 6, 2013.
Final Office Action dated Nov. 7, 2014, pp. 16, for U.S. Appl. No. 14/073,551, filed Nov. 6, 2013.
Response dated Feb. 9, 2015, pp. 9, to Final Office Action dated Nov. 7, 2014, pp. 16, for U.S. Appl. No. 14/073,551, filed Nov. 6, 2013.
Office Action dated May 19, 2015, pp. 22, for U.S. Appl. No. 14/073,551, filed Nov. 6, 2013.
Response dated Aug. 19, 2015, pp. 10, to Office Action dated May 19, 2015, pp. 22, for U.S. Appl. No. 14/073,551, filed Nov. 6, 2013.
Notice of Allowance dated Sep. 1, 2015, pp. 13, for U.S. Appl. No. 14/073,551, filed Nov. 6, 2013.
Office Action dated Mar. 14, 2014, pp. 17, for U.S. Appl. No. 13/569,951, filed Aug. 8, 2012.
Response dated Jun. 16, 2014, pp. 19, to Office Action dated Mar. 14, 2014, pp. 17, for U.S. Appl. No. 13/569,951, filed Aug. 8, 2012.
Notice of Allowance dated Sep. 9, 2014, pp. 27, for U.S. Appl. No. 13/569,951, filed Aug. 8, 2012.
Notice of Allowance dated Jan. 22, 2015, pp. 14, for U.S. Appl. No. 13/569,951, filed Aug. 8, 2012.
Notice of Allowance dated Jul. 30, 2015, pp. 15, for U.S. Appl. No. 13/569,951, filed Aug. 8, 2012.
Preliminary Remarks dated Nov. 6, 2013, pp. 2, for U.S. Appl. No. 14/073,570, filed Nov. 6, 2013.
Office Action dated Mar. 20, 2014, pp. 15, for U.S. Appl. No. 14/073,570, filed Nov. 6, 2013.
Response dated Jun. 20, 2014, pp. 17, to Office Action dated Mar. 20, 2014, pp. 15, for U.S. Appl. No. 14/073,570, filed Nov. 6, 2013.
Notice of Allowance dated Sep. 9, 2014, pp. 24, for U.S. Appl. No. 14/073,570, filed Nov. 6, 2013.
Notice of Allowance dated Jan. 20, 2015, pp. 15, for U.S. Appl. No. 14/073,570, filed Nov. 6, 2013.
Office Action dated Jun. 19, 2015, pp. 39, for U.S. Appl. No. 14/588,833, filed Jan. 2, 2015.
Response dated Sep. 21, 2015, pp, 13, to Office Action dated Jun. 19, 2015, pp. 39, for U.S. Appl. No. 14/588,833, filed Jan. 2, 2015.
Office Action dated Aug. 28, 2014, pp. 15, for U.S. Appl. No. 13/747,351, filed Jan. 22, 2013.
Response tiled Nov. 28, 2014, pp. 8, to Office Action dated Aug. 28, 2014, pp. 15, for U.S. Appl. No. 13/747,351, filed Jan. 22, 2013.
Final Office Action dated Feb. 23, 2015, pp. 024, for U.S. Appl. No. 13/747,351, filed Jan. 22, 2013.
Response filed May 21, 2015, pp. 8, to Final Office Action dated Feb. 23, 2015, pp. 024, for U.S. Appl. No. 13/747,351, filed Jan. 22, 2013.
Notice of Allowance dated Jun. 10, 2015, pp. 18, for U.S. Appl. No. 13/747,351, filed Jan. 22, 2013.
Preliminary Amendment dated Nov. 6, 2013, pp. 4, for U.S. Appl. No. 14/073,612, filed Nov. 6, 2013.

(56) References Cited

OTHER PUBLICATIONS

Office Action dated Aug. 29, 2014, pp. 29, for U.S. Appl. No. 14/073,612, filed Nov. 6, 2013.
Response filed Dec. 1, 2014, pp. 6, to Office Action dated Aug. 29, 2014, pp. 29, for U.S. Appl. No. 14/073,612, filed Nov. 6, 2013.
Notice of Allowance dated Feb. 3, 2016, p. 13, for U.S. Appl. No. 14/073,551, filed Nov. 6, 2011.
Response dated Mar. 24, 2016, p. 10, to Office Action dated Dec. 24, 2015, p. 37, for U.S. Appl. No. 14/852,123, filed Sep. 11, 2015.
Final Office Action dated Mar. 21, 2016, p. 34, for U.S. Appl. No. 14/588,833, filed Jan. 2, 2015.
Response dated Mar. 17, 2016, p. 6, to Office Action dated Dec. 17, 2015, p. 33, for U.S. Appl. No. 14/189,415, filed Sep. 9, 2015.
Notice of Allowance dated Feb. 12, 2016 for U.S. Appl. No. 13/491,818, filed Jun. 8, 2012.

* cited by examiner

PERFORMING ASYNCHRONOUS DISCARD SCANS WITH STAGING AND DESTAGING OPERATIONS

CROSS-REFERENCE TO RELATED APPLICATIONS

This application is a continuation of application Ser. No. 14/073,551 filed on Nov. 6, 2013, wherein application Ser. No. 14/073,551 is a continuation of application Ser. No. 13/491,818 filed on Jun. 8, 2012, which applications are incorporated herein by reference in their entirety.

BACKGROUND

1. Field

The disclosure relates to a method, system, and article of manufacture for performing asynchronous discard scans with staging and destaging operations.

2. Background

A storage controller may be coupled to one or more of a plurality of hosts. The storage controller may manage a plurality of storage devices, such as disk drives, tape drives, etc., that are coupled to the storage controller. The plurality of hosts may access data stored in the storage devices via the storage controller.

The storage controller may maintain a cache, where a cache is a type of storage that is capable of providing faster access to data in comparison to storage devices such as disk drives or tape drives. The storage space provided by the cache is smaller in size than the storage space provided by the disk drives or tape drives, where the storage provided by the disk drives or tape drives, and other devices, may be referred to as secondary storage. As a result, tracks may need to be staged (i.e., moved to the cache from secondary storage) or destaged (i.e., moved from the secondary storage to the cache) to prevent the cache from becoming full and to provide faster access to data. In many situations, to release space in the cache, tracks may be discarded from the cache via discard scans.

A "Task Control Block" (TCB) is a data structure in the operating system kernel containing the information needed to manage a particular process. Storage controllers may move information to and from storage devices, and to and from the cache by using TCBs to manage the movement of data.

SUMMARY OF THE PREFERRED EMBODIMENTS

Provided are a method, a system, and a computer program product in which a controller receives a request to perform staging or destaging operations with respect to an area of a cache. A determination is made as to whether one or more discard scans are being performed or queued for the area of the cache. In response to determining that one or more discard scans are being performed or queued for the area of the cache, the controller avoids satisfying the request to perform the staging or the destaging operations or a read hit with respect to the area of the cache.

In additional embodiments, in response to determining that one or more discard scans are not being performed or queued for the area of the cache, the controller satisfies the request to perform the staging or the destaging operations or the read hit with respect to the area of the cache.

In further embodiments, the cache is a flash cache and discard scans are performed asynchronously with respect to a request from a host to the controller to release space in the flash cache.

In certain embodiments, the area of the cache corresponds to an extent, a track, a volume, a logical subsystem or any other representation of storage.

In additional embodiments, the controller maintains a plurality of logical subsystems, wherein each logical subsystem stores a plurality of volumes, and where a logical storage group is a plurality of logical subsystems that is owned for input/output (I/O) operations. In response to determining that one or more discard scans are being performed or queued for the logical storage group, the controller bypasses the flash cache for stages or destages, and directly stages from disk drives or directly destages to the disk drives.

In yet additional embodiments, the controller maintains a plurality of logical subsystems, where each logical subsystem stores a plurality of volumes. The controller receives a request for a discard scan from the cache, and queues a discard task control block for the discard scan for the volume for which the discard scan is requested. The controller determines from discard task control blocks whether staging or destaging operations are for tracks in a range of tracks being discarded via discard scans. In response to determining from the discard task control blocks that the staging or destaging operations are for tracks in the range of tracks being discarded via the discard scans, the controller avoids satisfying the request to perform the staging or the destaging operations.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Storage space may be released in a storage controller for a plurality of reasons. In certain embodiments, storage space may be released when a volume is deleted. In other embodiments, storage space may be released, in response to receiving a host command to reclaim storage space. In certain embodiments, a flash cache is maintained in the storage controller to provide faster access to data to the host. For space to be released, tracks in flash cache may have to be discarded. A discard scan needs to scan the cache directory and discard tracks corresponding to the space being released. In certain embodiments flash cache discard scans are performed asynchronously with respect to requests for space release received from the host.

In certain embodiments, if stage or destage requests are received when asynchronous discard scans are being performed from the flash cache, the stage or destage requests are not satisfied if the tracks (or extents, volumes, logical subsystems, logical subsystem groups, etc.) are undergoing discard scans.

Exemplary Embodiments

Figure 1:
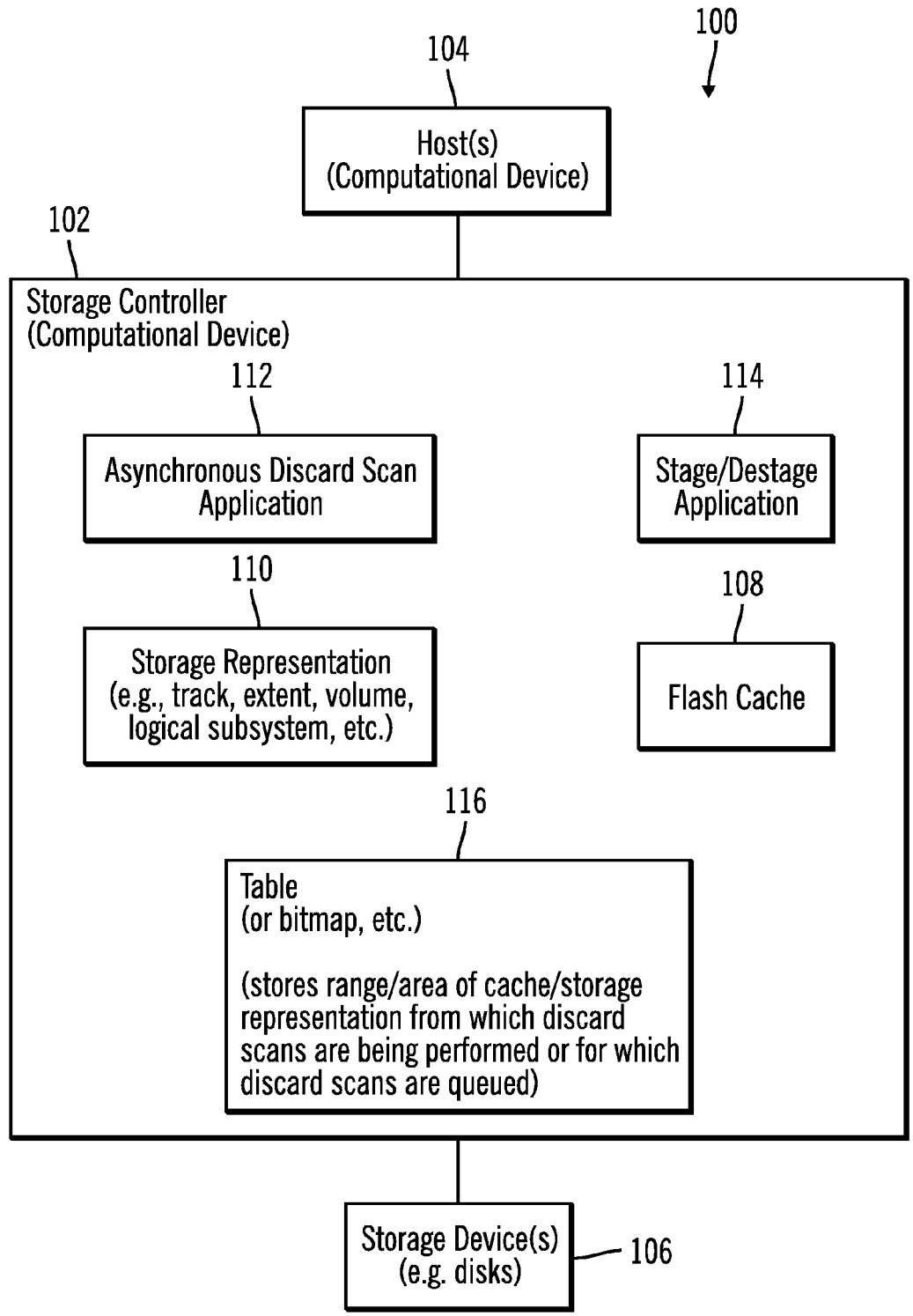
FIG. 1 illustrates a block diagram of a computing environment that includes a storage controller coupled to a host, in accordance with certain embodiments.

FIG. 1 illustrates a block diagram of a computing environment 100 that includes a storage controller 102 coupled to one or more hosts 104, in accordance with certain embodiments. The storage controller manages storage for the host 104, by controlling one or more storage devices 106.

The storage controller 102 and the hosts 104 may comprise any suitable computational device including those presently known in the art, such as, a personal computer, a workstation, a server, a mainframe, a hand held computer, a palm top computer, a telephony device, a network appliance, a blade computer, a server, etc. The storage devices 106 may comprise any suitable storage device including those presently known in the art, such as magnetic disks, optical disks, tapes, etc. In certain embodiments, the host 104, the storage controller 102, and the storage devices 106 may be coupled via a network, such as the Internet, an intranet, a storage area network, a local area network, etc.

The storage controller 102 may include a flash cache 108. In certain embodiments, the flash cache 108 may be comprised of a plurality of solid state disks. The flash cache 108 may provide caching services to cache data and provide faster access to data stored in the storage devices 106. The data stored in the flash cache 108 and any other storage media either inside or coupled to the storage controller 102 may be represented via storage representations 110, such as tracks, extents, volumes, logical subsystems, etc.

The storage controller 102 also includes an asynchronous discard scan application 112 that executes in the storage controller 102. The asynchronous discard scan application 112 may be implemented in software, firmware, hardware, or any combination thereof. The asynchronous discard scan application 112 when executed may perform discard scan processes that are used to determine tracks to be discarded from the flash cache 108 to release space in the flash cache 108.

The storage controller 102 also includes an stage/destage application 114 that executes in the storage controller 102. The stage/destage application 114 may be implemented in software, firmware, hardware, or any combination thereof. The stage/destage application 114 when executed may perform staging of data from the storage devices 106 to the flash cache 108 and/or the destaging of data from the flash cache 108 to the storage devices 106.

The storage controller 102 may also maintain a data structure, such as a table 116 or a bitmap that may store the ranges of tracks or areas of the flash cache 108 from which discard scans are being performed or for which discard scans have been queued. In alternative embodiments, the table 116 may store the identities of extents, volumes, logical subsystems from which discard scans are being performed or for which discard scans have been queued.

Therefore, FIG. 1 illustrates certain embodiments in which a storage controller 102 maintains a flash cache 108 from which space may be released via an asynchronous discard scan application 112. While discard scans are in progress or queued to areas of the flash cache 108, certain embodiments do not satisfy stage/destage requests with respect to those areas of the flash cache 108. Additionally, not only are stage/destage requests not satisfied but also operations are performed to not satisfy read hits that are run in a "bypass cache" mode until the discard scans have completed: i.e., the following operations are performed: (a) do not promote to the cache (i.e. do not stage); (b) do not demote from the cache (i.e., do not destage); and (c) do not satisfy a read hit from the cache (i.e., bypass cache completely).

Figure 2:
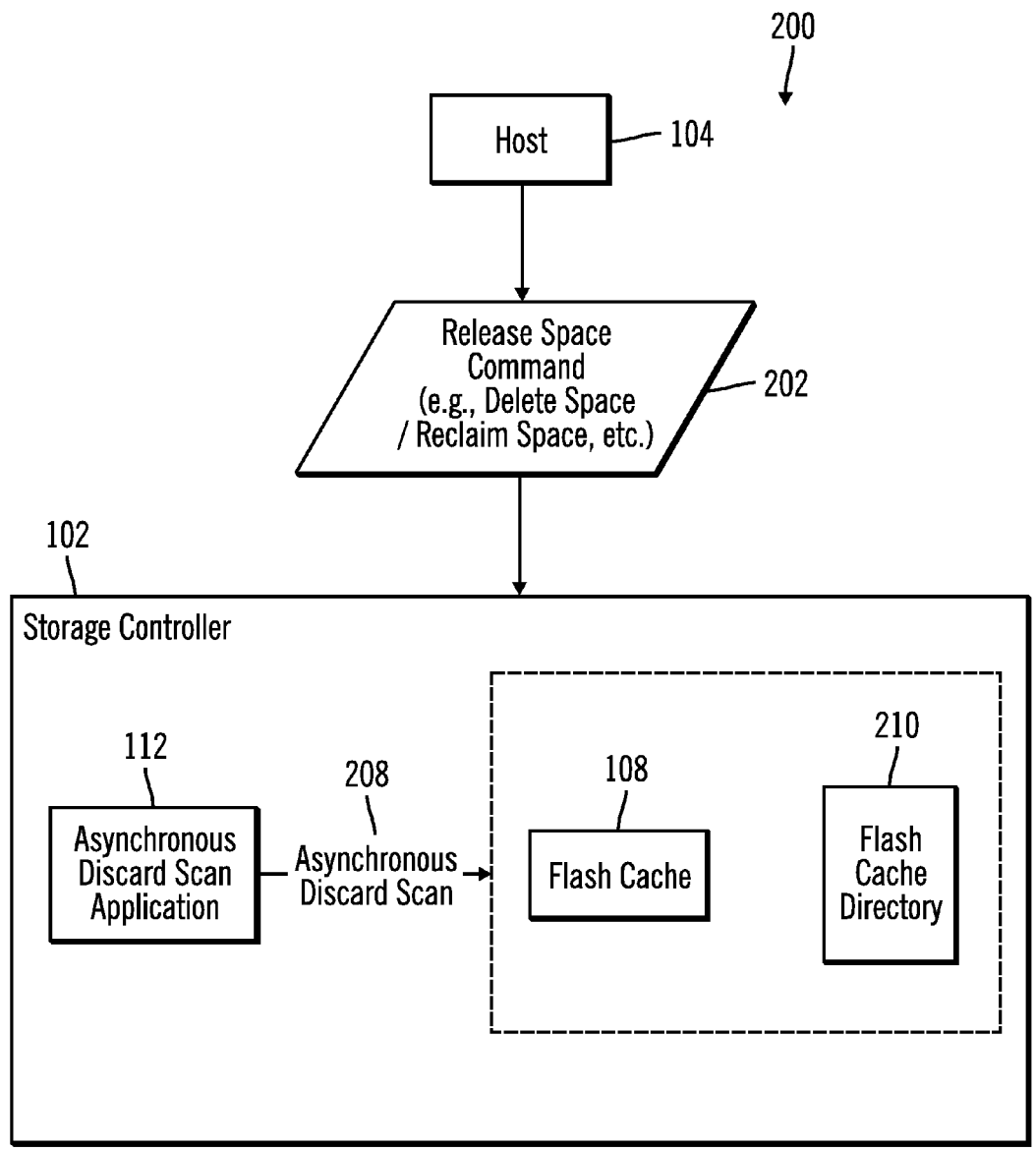
FIG. 2 illustrates a block diagram that shows asynchronous discard scans being performed in a storage controller, in accordance with certain embodiments.

FIG. 2 illustrates a block diagram 200 that shows asynchronous discard scans being performed in the storage controller 102, in accordance with certain embodiments.

In certain embodiments, the host 104 may send the storage controller 102 a release space command 202, where the release space command 202 may request that space is to be released by the storage controller 102. The release of space may occur through various mechanisms, such as deletion of space, reclamation of space, etc.

The storage controller 102 receives the release space command 202, and in response the asynchronous discard scan application 112 may start an asynchronous discard scan process 208 to scan flash cache directory 210 corresponding to the flash cache 108, to determine tracks that are to be discarded from the flash cache 108. The asynchronicity of the asynchronous discard scan process 208 is with respect to the release space command 202, i.e., the release space command 202 does not wait for completion while the asynchronous discard scan process 208 is being executed.

Tracks are discarded asynchronously from the flash cache 108 because the memory size and the number of tracks in the flash cache 108 are of a sufficiently large magnitude, such that the release space command 202 may fail via timeouts, etc., should the release space command 202 wait while tracks are being discarded from the flash cache 108.

Figure 3:
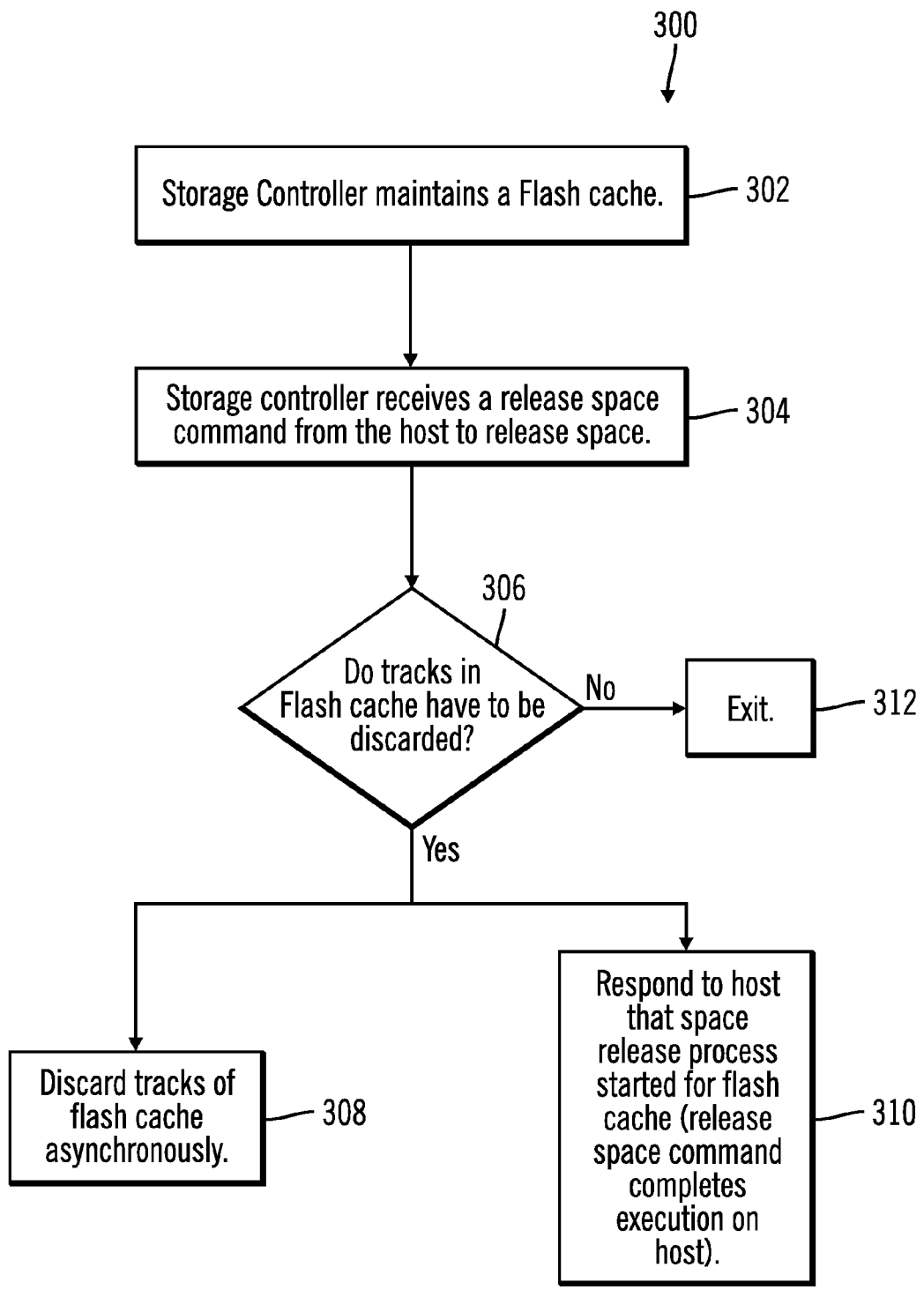
FIG. 3 illustrates flowchart that shows asynchronous discard of tracks in a flash cache, in accordance with certain embodiments.

FIG. 3 illustrates flowchart 300 that shows asynchronous discard of tracks in a flash cache 108, in accordance with certain embodiments. The operations shown in FIG. 3 may be performed by the asynchronous discard scan application 112 that executes in the storage controller 102.

Control starts at block 302, in which the storage controller 102 maintains a flash cache 108. Control proceeds to block 304, in which the storage controller 102 receives a release space command 202 from the host 104 to release space.

From block 304 control proceeds to block 306. At block 306, the asynchronous discard scan application 112 that executes in the storage controller 102 determines whether tracks in the flash cache 108 have to be discarded. If so, control proceeds to blocks 308 and 310 in parallel, and the asynchronous discard scan application 112 discards (at block 308) tracks of the flash cache 108 asynchronously, and in parallel (i.e., prior to completion of the asynchronous discards) responds (at block 310) to the host 104 that the space release process has started for the flash cache 108, and the release space command 202 completes execution. It may be noted that the release space command 202 completes execution while the asynchronous discard scans 208 are still being executed.

From block 306, the process may exit (at block 312) if no tracks have to be discarded from the flash cache 108.

Therefore, FIG. 3 illustrates certain embodiments in which asynchronous discards are performed from the flash cache 108.

Figure 4:
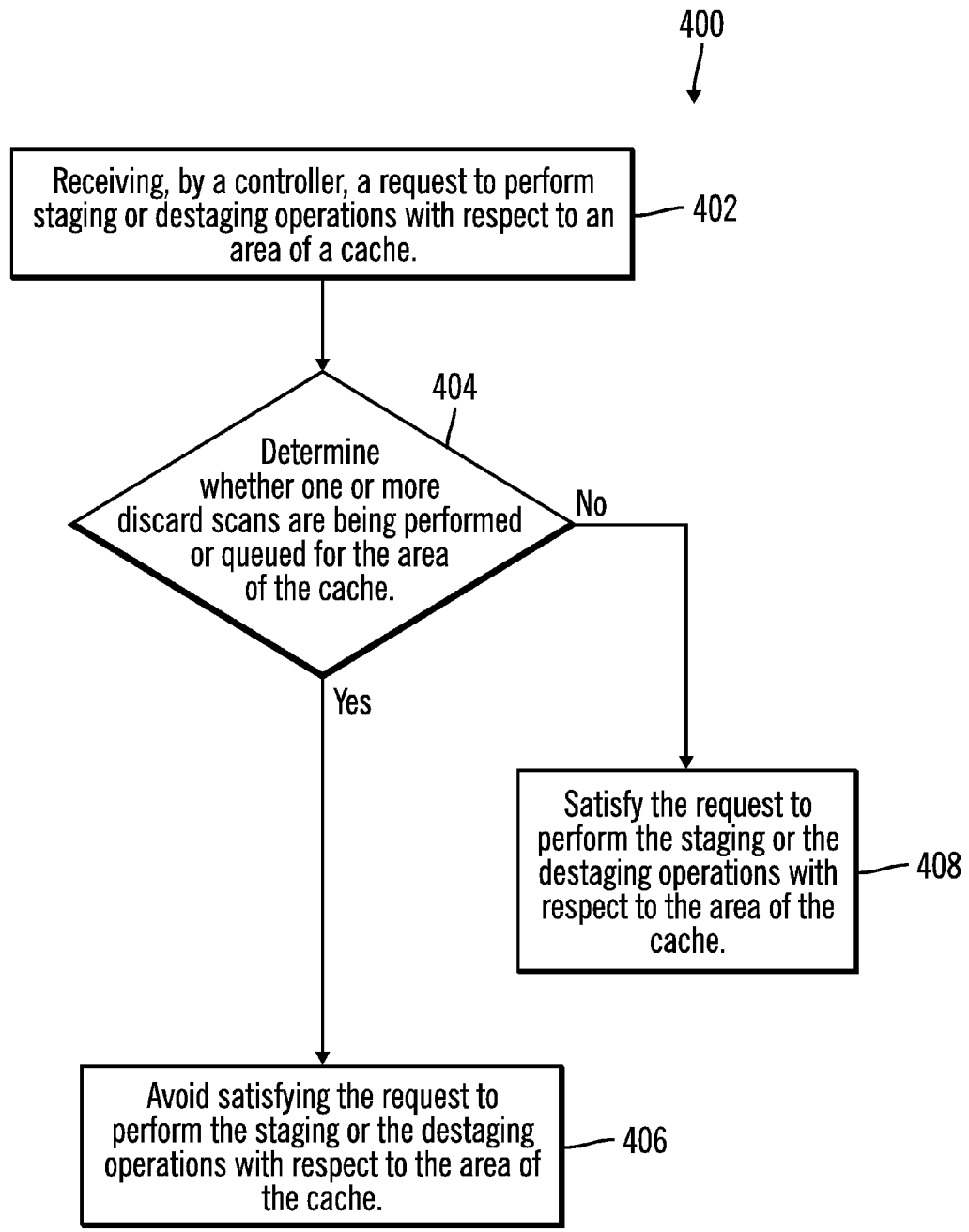
FIG. 4 illustrates a flowchart that shows how requests for staging or destaging operations are satisfied when asynchronous discard scans are in progress, in accordance with certain embodiments.

FIG. 4 illustrates a flowchart 400 that shows how requests for staging or destaging operations are satisfied when asynchronous discard scans are in progress, in accordance with certain embodiments. The operations shown in FIG. 4 may be performed by the asynchronous discard scan application 112 and the stage/destage application 114 that execute in the storage controller 102. Control starts at block 402 in which the storage controller 102 receives a request to perform staging or destaging operations with respect to an area of the flash cache 108, where in certain embodiments the flash cache 108 may be some other type of cache. A determination is made (at block 404) as to whether one or more discard scans are being performed or queued for the area of the flash cache 108. In certain embodiments, the area of the flash cache 108 corresponds to an extent, a track, a volume, a logical subsystem or any other representation of storage.

In response to determining that one or more discard scans are being performed or queued for the area of the flash cache ("Yes" branch from block 404), the storage controller 102 avoids (at block 406) satisfying the request to perform the staging or the destaging operations with respect to the area of the flash cache 108. The storage controller 102 may communicate to the requestor of the stage/destage operations that the storage areas (or the corresponding storage representations such as tracks, extents, volumes, logical subsystems, etc.) are unavailable because of discard scans.

In response to determining that one or more discard scans are not being performed or queued for the area of the flash cache ("No" branch from block 404), the storage controller 102 satisfies (at block 408) the request to perform the staging or the destaging operations with respect to the area of the flash cache 108.

Therefore, FIG. 4 illustrates certain embodiments, in which while a discard scan is in progress or is queued, areas of the flash cache 108 from which discards are being performed cannot be used for stage or destage operations.

Figure 5:
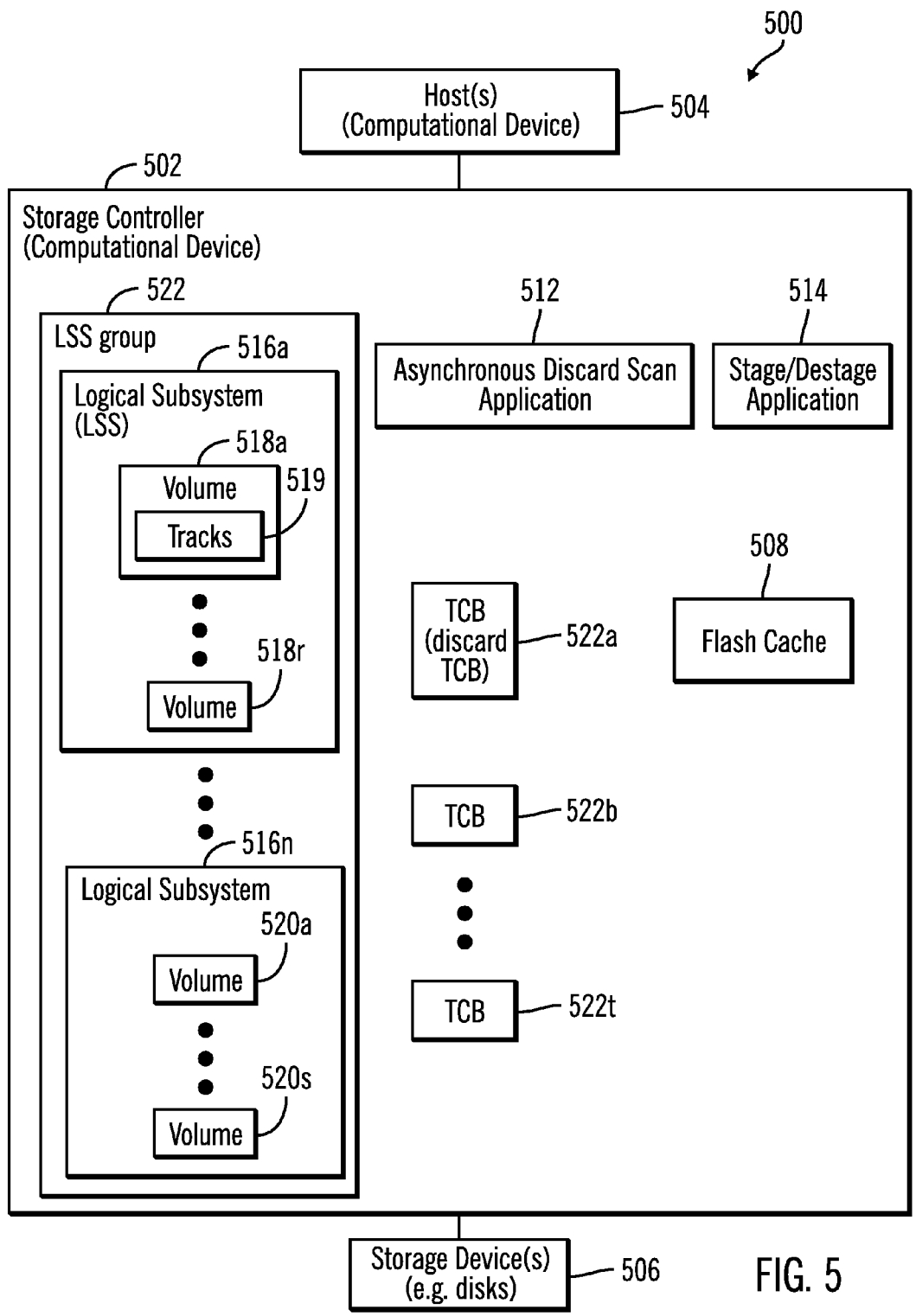
FIG. 5 illustrates a block diagram of another computing environment that includes a storage controller coupled to a host, in accordance with certain embodiments, in accordance with certain embodiments.

FIG. 5 illustrates a block diagram of another computing environment 500 that includes a storage controller 502 coupled to a host 504 and storage devices 506, in accordance with certain embodiments. The storage controller 504 includes an asynchronous discard scan application 512 and a stage/destage application 514. Additionally, a flash cache 508 is maintained within or coupled to the storage controller 502.

The storage controller 502 controls a plurality of logical subsystems (LSS) 516a . . . 516n where a logical subsystem may be comprised of a plurality of volumes, and where a volume may be comprised of a plurality of tracks 519. For example, logical subsystem 516a is comprised of volumes 518a . . . 518r, and logical subsystem 516n is comprised of volumes 520a . . . 520s. A plurality of logical subsystems that is owned for Input/Output (I/O) may be referred to as a logical subsystem group 522.

The storage controller may also maintain a plurality of task control blocks (TCB) 522a . . . 522t, where each task control block is referred to as a discard TCB that is a data structure in the operating system kernel containing the information needed to manage a discard scan process corresponding to a range of tracks, volumes, LSS, or an LSS group.

Therefore, FIG. 5 illustrates certain embodiments in which, the storage controller 502 maintains a plurality of logical subsystems 516a . . . 516n, where each logical subsystem stores a plurality of volumes, and where a logical storage group is a plurality of logical subsystems that is owned for input/output (I/O) operations. Task control blocks are maintained for managing discard scan processes created by the asynchronous discard scan application 112 to perform discard scans from the flash cache 508.

Figure 6:
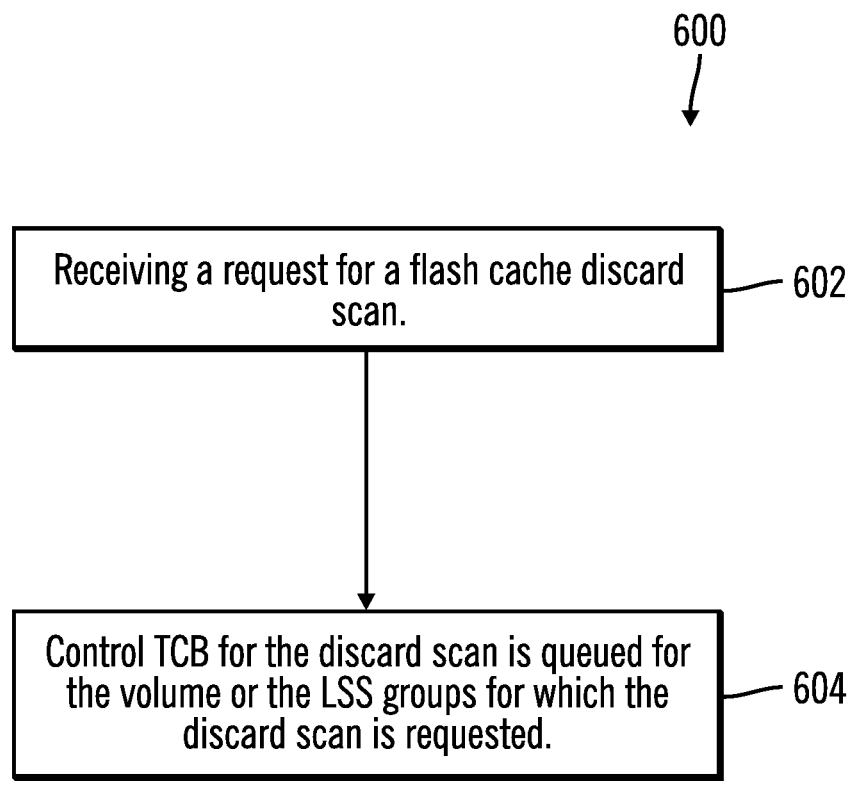
FIG. 6 illustrates a flowchart that shows creation of task control blocks for discard scans, in accordance with certain embodiments.

FIG. 6 illustrates a flowchart 600 that shows creation of task control blocks 522a . . . 522t for discard scans, in accordance with certain embodiments. The operations shown in flowchart 600 may be performed by the asynchronous discard scan application 512 that executes in the storage controller 502.

Control starts at block 602 in which the storage controller 602 receives a request for a discard scan to be performed from the flash cache 508. Control proceeds to block 604 in which the storage controller 602 queues a discard task control block (e.g., discard TCB 522a in FIG. 5) for the discard scan for the volume for which the discard scan is requested.

Therefore, FIG. 6 illustrate certain embodiments that shows how discard task control blocks 522a . . . 522t are generated for performing discard scans from the flash cache 508. Certain of the TCBs 522a . . . 522t may be in a queued state while other TCBs are being processed for discard scans that are in progress.

Figure 7:
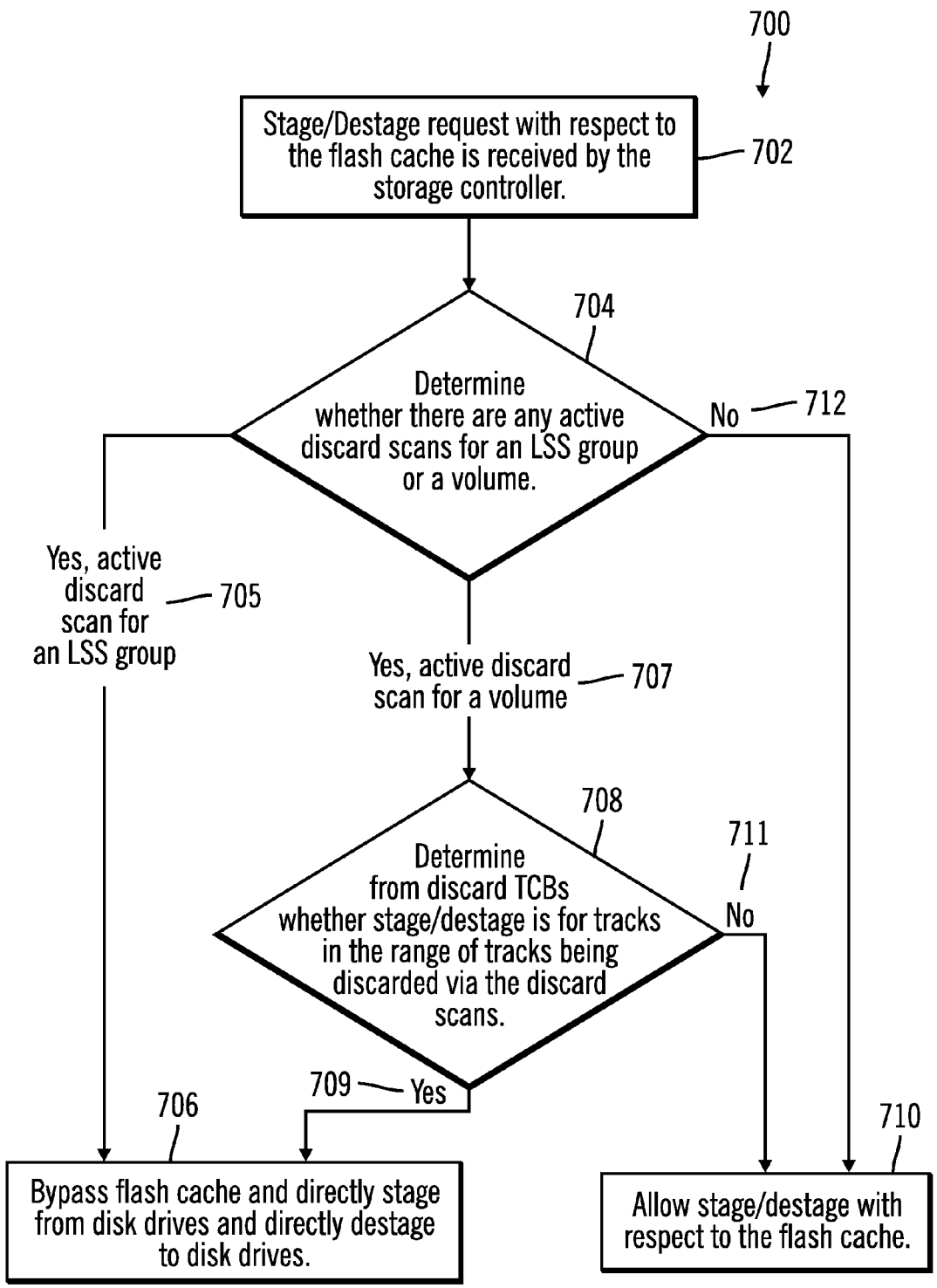
FIG. 7 illustrates a flowchart that shows how requests for staging or destaging operations are satisfied in a system with logical subsystems and volumes when asynchronous discard scans are in progress, in accordance with certain embodiments.

FIG. 7 illustrates a flowchart 700 that shows how requests for staging or destaging operations are satisfied in a storage controller 502 with logical subsystems 516a . . . 516n and volumes 518a . . . 518r, 520a . . . 520s, when asynchronous discard scans are in progress, in accordance with certain embodiments. The operations shown in flowchart 700 may be performed by the asynchronous discard scan application 512 and the stage/destage application 514 that execute in the storage controller 502.

Control starts at block 700 in which a stage/destage request with respect to the flash cache 508 is received by the storage controller 502. Control proceeds to block 704 in which a determination is made as to whether there are any active discard scans for a logical subsystem group or a volume. If there is an active discard scan for a logical subsystem group (branch shown via reference numeral 705) control proceeds to block 706 in which the flash cache 508 is bypassed and data is directly staged from disk drives 106 and directly destaged to disk drives 106. Additionally, the storage controller 508 may send a message to the requestor of the stage/destage request that the logical subsystem group for stage/destage is unavailable as it is being used for discard scans or some other informative message.

At block 704 a determination may be made that there is a active discard scan for a volume (branch shown via reference numeral 707) and control proceeds to block 708 in which a determination is made from discard task control blocks 522a . . . 522t whether the stage/destage requested is for tracks in the range of tracks being discarded or queued for being discarded via the discard scans. If so, ("Yes" branch 709) stage or destage with respect to the flash cache 508 are avoided (at block 706). If not ("No" branch 711) stage/destage with respect to the flash cache 508 are allowed and the stage/destage operations are performed (at block 710).

If at block 704 a determination is made that there are no active discard scans for a logical subsystem group or a volume ("No" branch 712) control proceeds to block 710 where stage/destage with respect to the flash cache 508 are allowed. and the stage/destage operations are performed.

Therefore, FIG. 7 illustrate certain embodiments in which stage or destage operations are avoided when the stage/destage is for tracks in the range of tracks being discarded via asynchronous discard scans. Additionally, stage/destage are avoided when there is an active discard scan for a logical subsystem group.

FIGS. 1-7 illustrate certain embodiments in which stages and destages from areas of the flash cache are avoided when discard scans are in progress or queued for the same areas of the flash cache. As a result, the asynchronous discard scans can progress much faster and without error in comparison to situations in which asynchronous discard scans are interrupted by stage and destage operations.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

* Java is a trademark or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
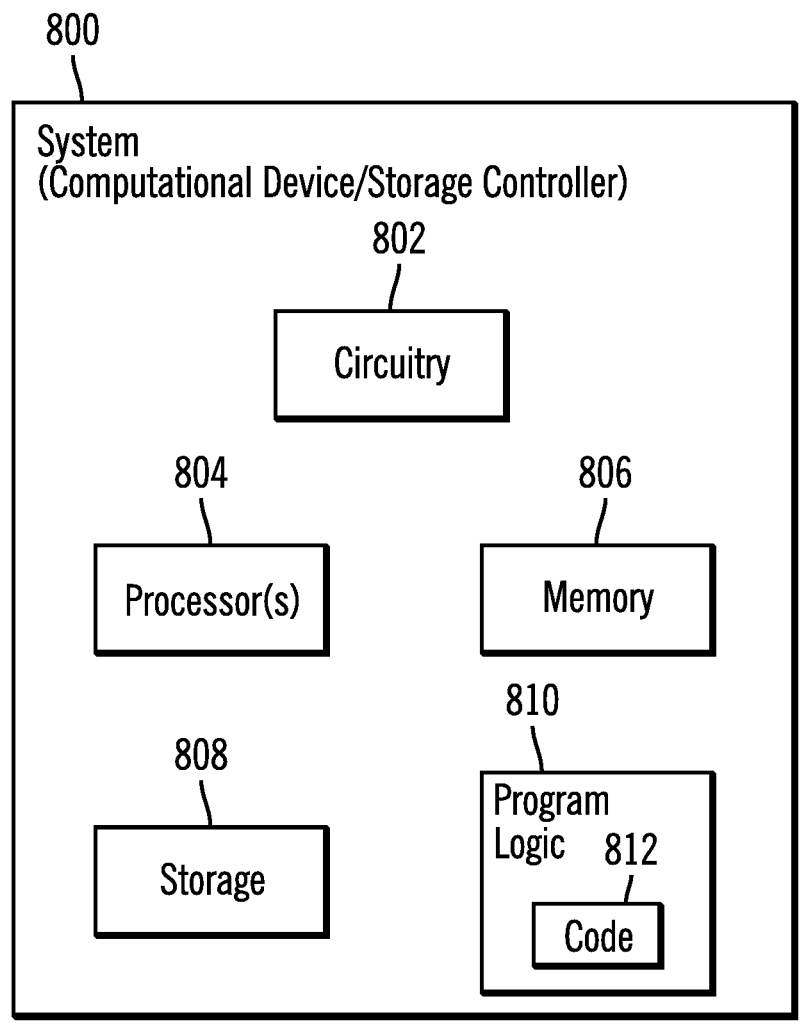
FIG. 8 illustrates a block diagram of a computational system that shows certain elements that may be included in at least the storage controllers of FIG. 1 or 5, in accordance with certain embodiments.

FIG. 8 illustrates a block diagram that shows certain elements that may be included in the storage controllers 102, 502 in accordance with certain embodiments. The system 800 may comprise the storage controllers 102, 502 and may include a circuitry 802 that may in certain embodiments include at least a processor 804. The system 800 may also include a memory 806 (e.g., a volatile memory device), and storage 808. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   maintaining a plurality of logical subsystems, wherein each logical subsystem stores a plurality of volumes;
   receiving, by a controller, a request to perform staging operations with respect to an area of a cache;
   in response to determining that one or more discard scans are being performed or queued for a volume, performing:
   in response to determining from discard task control blocks that the staging operations are not for tracks in a range of tracks being discarded via the discard scans, satisfying the request to perform the staging operations; and
   in response to determining from the discard task control blocks that the staging operations are for tracks in the range of tracks being discarded via the discard scans, bypassing the cache for stages, and directly stage from one or more disk drives.

2. The method of claim 1, wherein performing the staging operations with respect to the area of the cache comprises moving one or more extents, tracks, volumes or logical subsystems from the one or more disk drives to the area of the cache.

3. The method of claim 1, wherein the area of the cache corresponds to an extent, a track, a volume, a logical subsystem or any other representation of storage.

4. The method of claim 1, the method further comprising:
   receiving a request for a discard scan from the cache;
   queuing a discard task control block for the discard scan for the volume for which the discard scan is requested;
   determining from discard task control blocks whether staging or destaging operations are for tracks in a range of tracks being discarded via discard scans.

5. A system coupled to a cache, the system comprising:
   a memory; and
   a processor coupled to the memory, wherein the processor performs operations, the operations comprising:
   maintaining a plurality of logical subsystems, wherein each logical subsystem stores a plurality of volumes;
   receiving, by a controller, a request to perform staging operations with respect to an area of the cache;
   in response to determining that one or more discard scans are being performed or queued for a volume, performing:
   in response to determining from discard task control blocks that the staging operations are not for tracks in a range of tracks being discarded via the discard scans, satisfying the request to perform the staging operations; and
   in response to determining from the discard task control blocks that the staging operations are for tracks in the range of tracks being discarded via the discard scans, bypassing the cache for stages, and directly stage from one or more disk drives.

6. The system of claim 5, wherein performing the staging operations with respect to the area of the cache comprises moving one or more extents, tracks, volumes or logical subsystems from the one or more disk drives to the area of the cache.

7. The system of claim 5, wherein the area of the cache corresponds to an extent, a track, a volume, a logical subsystem or any other representation of storage.

8. The system of claim 5, the operations further comprising:
   receiving a request for a discard scan from the cache;
   queuing a discard task control block for the discard scan for the volume for which the discard scan is requested;
   determining from discard task control blocks whether staging or destaging operations are for tracks in a range of tracks being discarded via discard scans.

9. A computer program product, the computer program product comprising a non-transitory computer readable storage medium having computer readable program code embodied therewith, the computer readable program code configured to perform operations on a controller coupled to a cache, the operations comprising:
   maintaining a plurality of logical subsystems, wherein each logical subsystem stores a plurality of volumes;
   receiving, by a controller, a request to perform staging operations with respect to an area of the cache;
   in response to determining that one or more discard scans are being performed or queued for a volume, performing:
      in response to determining from discard task control blocks that the staging operations are not for tracks in a range of tracks being discarded via the discard scans, satisfying the request to perform the staging operations; and
      in response to determining from the discard task control blocks that the staging operations are for tracks in the range of tracks being discarded via the discard scans, bypassing the cache for stages, and directly stage from one or more disk drives.

10. The computer program product of claim 9, wherein performing the staging operations with respect to the area of the cache comprises moving one or more extents, tracks, volumes or logical subsystems from the one or more disk drives to the area of the cache.

11. The computer program product of claim 9, wherein the area of the cache corresponds to an extent, a track, a volume, a logical subsystem or any other representation of storage.

12. The computer program product of claim 9, the operations further comprising:
   receiving a request for a discard scan from the cache;
   queuing a discard task control block for the discard scan for the volume for which the discard scan is requested;
   determining from discard task control blocks whether staging or destaging operations are for tracks in a range of tracks being discarded via discard scans.

* * * * *